United States Patent [19]

Kelley et al.

[11] Patent Number: 4,941,153
[45] Date of Patent: Jul. 10, 1990

[54] HIGH-SPEED DIGITAL DATA COMMUNICATION SYSTEM

[75] Inventors: Edwin A. Kelley; Wade J. Stone, both of Los Angeles, Calif.

[73] Assignee: Hughes Aircraft Company, Los Angeles, Calif.

[21] Appl. No.: 89,281

[22] Filed: Aug. 25, 1987

[51] Int. Cl.$^5$ ............................................. H04B 3/50
[52] U.S. Cl. ..................... 375/36; 330/255; 330/289
[58] Field of Search ................. 375/17, 36; 178/63 R, 178/63 B, 63 C; 307/455, 456, 475; 330/255, 256, 262, 272, 275, 301, 186, 289

[56] References Cited

U.S. PATENT DOCUMENTS

| | | | |
|---|---|---|---|
| 3,105,198 | 9/1963 | Higginbotham | 330/272 |
| 3,375,457 | 3/1968 | Hollstein, Jr. | 330/255 |
| 4,326,287 | 4/1982 | Abramson | 375/36 |
| 4,450,571 | 5/1984 | Hirayama et al. | 375/36 |
| 4,607,232 | 8/1986 | Gill, Jr. | 330/255 |
| 4,713,827 | 12/1987 | Lauffer et al. | 375/36 |
| 4,736,385 | 4/1988 | Pratt et al. | 375/36 |
| 4,755,767 | 7/1988 | Yamatake | 330/255 |

*Primary Examiner*—Benedict V. Safourek
*Attorney, Agent, or Firm*—Leonard A. Alkov; Wanda Denson-Low

[57] ABSTRACT

According to the invention, a high-speed digital data communication system employs current mode circuitry as input and output devices at the ends of a transmission line, such as the interconnections between integrated circuit chips. Specifically, a current mode driver switch generates output current amplitudes responsive to a source of a digital signal representative of data to be transmitted. The switch output is connected to the input of a transmission line. The output of the transmission line is connected to the input of a receiving circuit that responds to the current amplitudes and has an input at an approximately constant voltage level. The receiving circuit is a transistor connected in a common base configuration. The emitter of the transistor is connected to the output of the transmission line. The base of the transistor is connected to a constant voltage source. A pulse shaper in the form of a Schmitt trigger has positive feedback from output to input. The described current mode circuitry is incorporated into an integrated circuit chip.

7 Claims, 4 Drawing Sheets

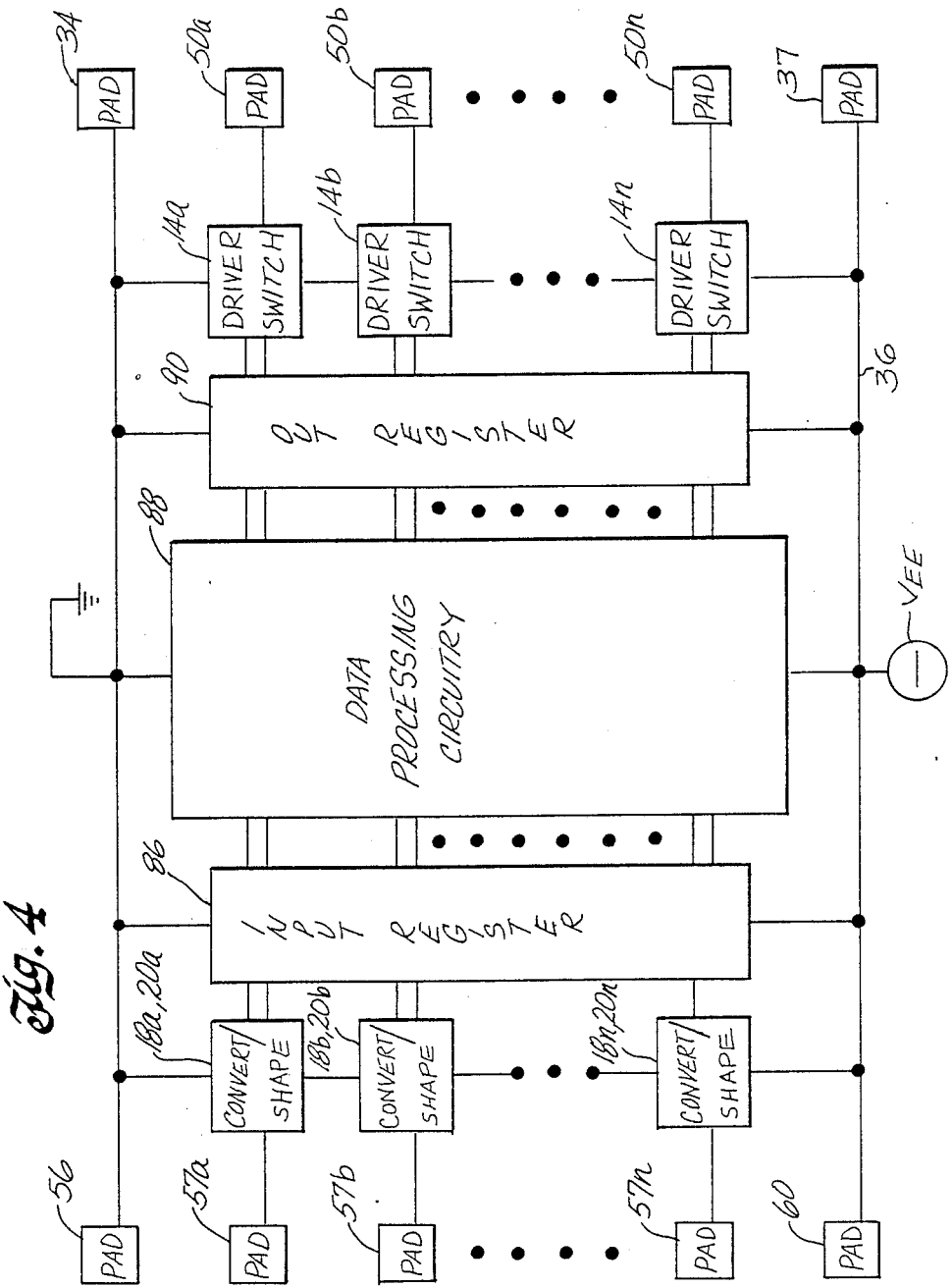

HIGH-SPEED DIGITAL DATA COMMUNICATION SYSTEM

BACKGROUND OF THE INVENTION

This invention relates to data communication and, more particularly, to a digital data communication system capable of high-speed data transfer with low power disipation.

In this age of microelectronics, thousands of electronic circuits can be incorporated in a single integrated circuit "chip", and many chips can be mounted on a single printed circuit board. Advances are being made to further miniaturize electronic systems and to reduce the power dissipated by such systems. The interconnections between integrated circuit chips on a printed circuit board functions as transmission lines in that they have distributed resistance, capacitance, and inductance, because of their interconnection length relative to the signal edge transition time of the waveform. As a result, usual transmission line considerations, such as impedance matching and power dissipation are major concerns in the design of inter-chip connections.

Conventionally, voltage mode circuitry is employed to transfer digital data between integrated circuit chips. To increase the data transmission speed, a high price must be paid in terms of power dissipation, because of the large voltage swing that must be repeatedly imposed on the inter-chip connection and the transmission line matching requirements. For example, to transmit data at a rate of 500 megabits per second, power dissipation of the order of 100 milliwatts per bit must be incurred.

SUMMARY OF THE INVENTION

According to the invention, a high-speed digital data communication system employs current mode circuitry as input and output devices at the ends of a transmission line, such as the interconnections between integrated circuit chips. Specifically, a current mode driver switch generates output current amplitudes responsive to a source of a digital signal representative of data to be transmitted. The switch is connected to the input of a transmission line. The output of the transmission line is connected to the input of a receiving circuit that responds to the current amplitudes and has an input at an approximately constant voltage level. The representation of the data as current amplitudes on the transmission line and the maintenance of an approximately constant voltage level on the transmission line reduce the power dissipation because the large parasitic capacitance does not interfere with data transfer, i.e., transmission.

A feature of the invention is the use of a transistor connected in a common base configuration as the receiving circuit. The emitter of the transistor is connected to the output of the transmission line. The base of the transistor is connected to a constant voltage source. A voltage mode output is presented at the collector of the transistor. The common base transistor serves to impress upon the transmission line an approximately constant voltage, while converting the current amplitudes on the line to voltage levels at the common base output. The common base transitor also serves to effectively terminate the transmission line with a matched impedance without incurring the large power dissipation of a resistive termination. Typically, digital data can be transmitted at a rate of 500 megabits per second, with power dissipation of the order of 10 milliwatts per bit. Thus, the rate of data transmission can be substantially increased without incurring a corresponding power dissipation penalty.

Another feature of the invention is a pulse shaper in the form of a Schmitt trigger having a positive feedback connection from output and input. This sharpens the pulses produced by the Schmitt trigger.

Another feature of the invention is the incorporation of the described current mode circuitry into an integrated circuit chip. The integrated circuit has a plurality of binary receiving circuits, an input register, data processing circuitry, an output register, and a plurality of current mode driver switches. The receiving circuits each have an input at an approximately constant voltage level and binary output. The input register stores data representing the binary state of the receiving circuits. The data processing circuitry is coupled to the input register to process the stored data. The output register is coupled to the data processing circuitry to store the processed data. The current mode driver switches are coupled to the output register to generate binary output current amplitudes representing the processed data. When a complex electronic system is constructed from the described integrated circuit chips interconnected by transmission lines, for example, in the form of conductive paths of a printed circuit board, the above-described improvements in data transmission rate and power dissipation can be attained.

Another feature of the invention is a method for testing the described current mode driver switch. The driver switch and voltmeter are connected to one node of a diode bridge. A DC reference voltage source is connected to a second node opposite the first node of the bridge. A first DC current source is connected to a third node between the first and second nodes. A second DC current source is connected to a fourth node between the first and second nodes. The direction of current flow of one current source vis-a-vis the bridge is opposite that of the other current source. The current sources define a threshold current amplitude. The diodes of the bridge are poled in the direction of current flow from one current source to the other. As the changing amplitude of the current generated by the driver crosses the threshold value, the voltage at the first node drops below the reference voltage level and when current amplitudes drops below the threshold level, the voltage at the first node returns to the reference voltage level.

BRIEF DESCRIPTION OF THE DRAWINGS

The features of specific embodiments of the best mode contemplated for carrying out the invention are illustrated in the drawings, in which.

Figure 1:
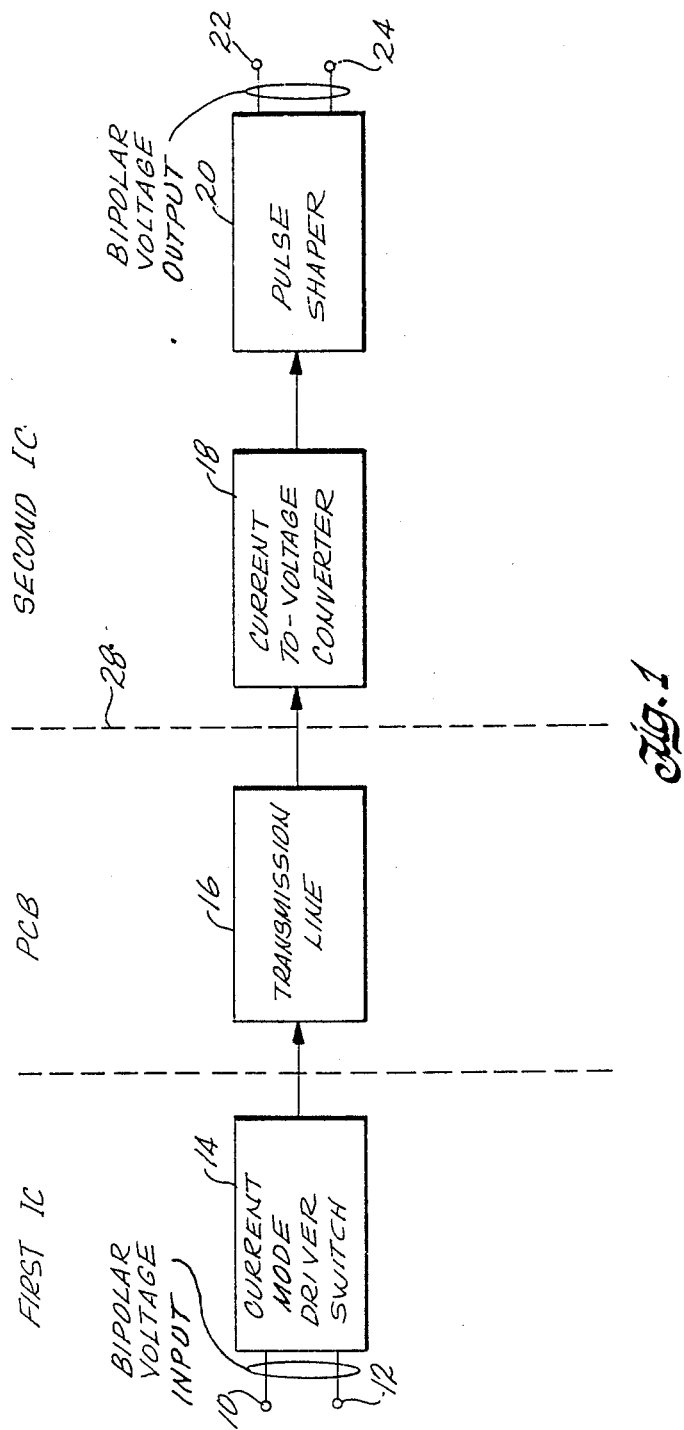
FIG. 1 is a schematic block diagram of a high-speed digital data communication system incorporating principles of the invention.
Figure 2:
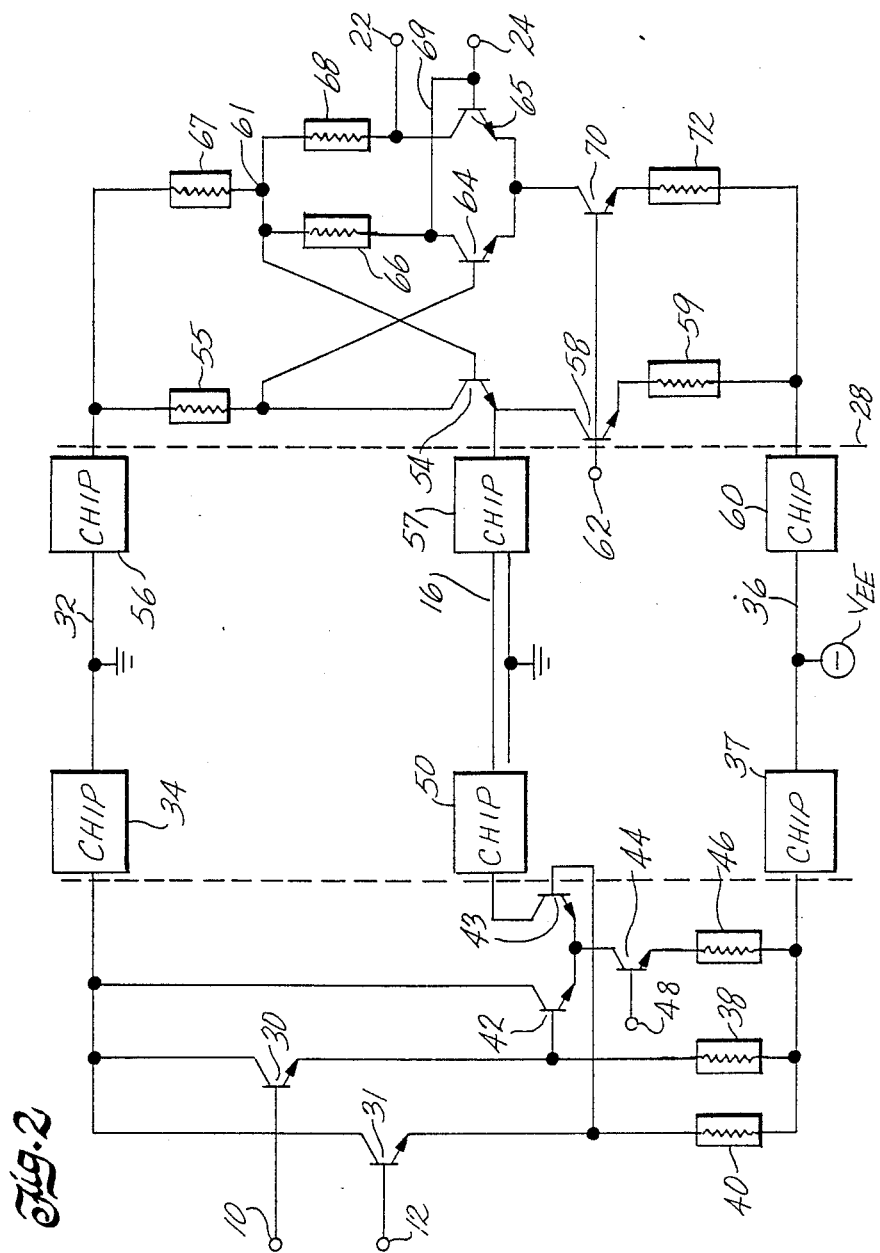
FIG. 2 is a schematic circuit diagram of the system of FIG. 1.
Figure 5:
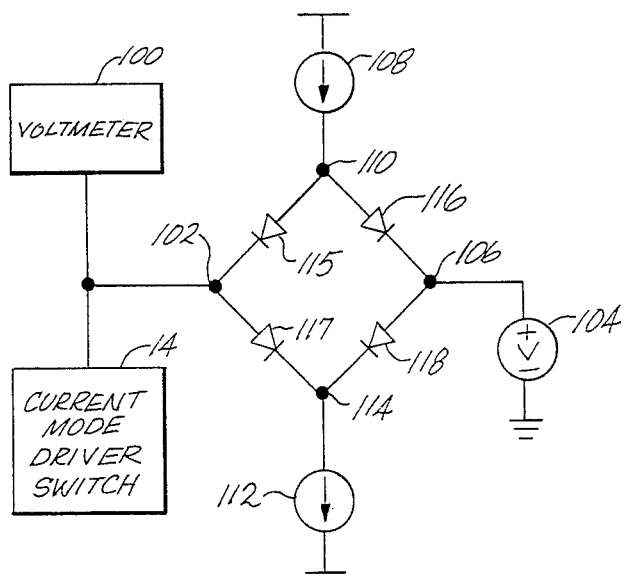

3 is a schematic circuit diagram of the temperature compensating bias voltage source for the system of FIG. 2;

FIG. 4 is a schematic block diagram illustrating incorporation of the invention into an integrated circuit chip; and FIG. 5 is a schematic diagram of a test setup for the current mode driver switch of the system of FIG. 1.

DETAILED DESCRIPTION OF THE SPECIFIC EMBODIMENTS

In the exemplary embodiments selected to illustrate the invention, it is assumed that the communication system is part of a complex binary digital data processing system that uses bipolar voltage signals. Considering in FIG. 1 one bit of binary data of the system, a bipolar voltage output representing the binary value of the bit from one integrated circuit chip is coupled to terminals 10 and 12 of a current mode driver switch 14 on board this integrated circuit chip. Switch 14 generates single-ended binary current amplitudes representative of data to be transferred to another integrated circuit chip via a transmission line 16. Transmission line 16 preferably comprises the interconnection between the integrated circuit chip on which switch 14 is mounted and another integrated circuit chip on which a current-to-voltage converter 18 is mounted, including conductive paths on a printed circuit board and internal integrated circuit conductive pads and package leads. The output of transmission line 16 is connected to the input of converter 18, which produces at its output voltage levels responsive to the line current amplitudes at its input. The input of converter 18 remains at an approximately constant voltage level, which also impresses on transmission line 16 an approximately constant voltage level. Thus, to transfer data from the output of one integrated circuit chip to the input of another integrated circuit chip does not require repeated voltage swing on the transmission line 16. Instead, the voltage on transmission line 16 is maintained at an approximately constant level and the data is transmitted in the form of changes in current amplitude. This permits transfer of data on transmission line 196 at a high data transmission rate, e.g., 500 metgabits per second, without large power dissipation. Typically the power dissipation is of the order of 10 milliwatts per bit. Preferably, converter 18 also presents to transmission line 16 a load impedance matched to its characteristic impedance without terminating resistors and the concomitant power dissipation. Converter 18 is coupled to a pulse shaper 20 that produces at terminals 22 and 24 a bipolar voltage input representing the binary value of the bit transferred by transmission line 16. Viewed spatially, switch 14 is mounted on board a first integrated circuit (IC) chip at a location on a printed circuit board (PCB) represented to the left of a broken line 26. Converter 18 and pulse shaper 20 are mounted on board a second integrated circuit (IC) chip at another location on the printed circuit board represented to the right of a broken line 28. Transmission line 16 includes a conductive path formed on the printed circuit board between the chips together with the pads and package leads of the integrated circuit chips.

In FIG. 2, which is a circuit diagram showing a detailed implementation of FIG. 1, the same reference numerals refer to the components described in connection with FIG. 1. Terminal 10 is connected to the base of an n-p-n transistor 30. Terminal 12 is connected to the base of an n-p-n transistor 31. A ground bus 22 is connected by a package lead and conductive pad of the chip represented at 34 to the collector of transistor 30 and the collector of transistor 31. A power bus 36 is connected by a package lead and conductive pad of the chip represented at 37 and a resistor 38 to the emitter of transistor 30 and by a resistor 40 to the emitter of transistor 31. A source of negative bias voltage $V_{EE}$ is connected to bus. N-p-n transistors 42 and 43 serve as the current mode driver switch. The emitter of transistor 30 is connected to the base of transistor 42. The emitter of transistor 31 is connected to the base of transistor 43. The emitters of transistors 42 and 43 are both connected to the collector of an n-p-n transistor 44. The emitter of transistor 44 is connected by a resistor 46 to power bus 36. A terminal 48 is connected to the base of transistor 44. As described in more detail in connection with FIG. 3, a conventional bias voltage source (not shown in FIG. 2) connected to terminal 48 compensates for changes in the characteristics of transistor 44 and resistor 46 with changing temperature so as to maintain the voltage across resistor 55 constant at both voltage levels. The collector of transistor 42 is directly connected to ground bus 32. The collector of transistor 43 is connected through a conductive pad and package lead of the chip represented at 50 to transmission line 16. Transmission line 16 has a large capacitance at pads 50 and 57.

In operation, when the bipolar voltage output applied to terminals 10 and 12 is such that the binary voltage level at terminal 10 is larger than the voltage level at terminal 12, transistor 42 is more conductive than transistor 43 and the collector current of transistor 43, which flows through transmission line 16 is at a low amplitude representative of one binary value. When the binary voltage level at terminal 12 is larger than terminal 10, transistor 43 is more conductive than transistor 42 and the current flowing through transmission line 16 is at a large amplitude representative of the other binary value. The sum of the current amplitudes flowing through transistors 42 and 43 remains approximately the same, however, irrespective of the binary value of the data bit. Transistors 42 and 43 are biased so that they operate in a current mode. The parameters are selected so that, consistent with current mode operation, the collector currents of transistors 42 and 43 do not become saturated. In summary, the driver switch comprising transistors 42 and 43 serves to convert the bipolar voltage output levels to a single ended current mode signal, the current amplitude of which represents the binary value of the data bit.

On board the other chip an n-p-n transistor 54 serves as the current-to-voltage converter. The collector of transistor 54 is connected by a load resistor 55 and a conductive pad and package lead of the chip represented at 56 to ground bus 32. The emitter of transistor 54 is connected through a conductive pad and package lead of the chip represented at 57 to transmission line 16. Although 50 and 57 are separately depicted in FIG. 2, they are part of transmission line 16 in the sense that they contribute to the distributed capacitance and the impedance between the driver switch and converter. The emitter of transistor 54 is connected to the collector of n-p-n transistor 58. The emitter of transistor 58 is connected by a resistor 59 and a conductive pad and package lead of the chip represented at 60 to power bus 36. A terminal 62 is connected to the base of transistor 58. The base of transistor 54 is connected to a node 61, described in more detail below. N-p-n transistors 64 and 65 serve as the pulse shaper. The collector of transistor 64 is connected by a load resistor 66 and a resistor 67 in series to ground bus 32. The collector of transistor 65 is connected by a load resistor 68 and resistor 67 to ground bus 32. One end of each of resistors 66 to 68 is connected to node 61. The emitters of transistors 64 and 65 are connected to the collector of an n-p-n transistor 70. The emitter of transistor 70 is connected by a resistor 72 to power bus 36. Terminal 62 is connected to the base of transistor 70. A connection 69 is formed between the base of transistor 65 and the collector of transistor 64. The collector of transistor 65 is connected to terminal 22 and the collector of transistor 64 is connected to terminal 24.

Figure 3:
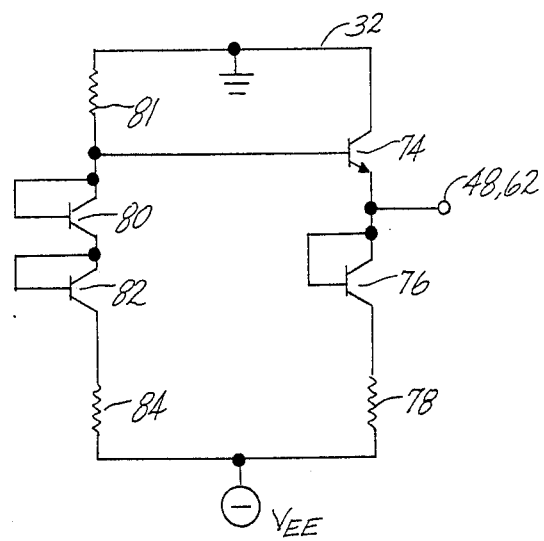

A conventional temperature compensating bias voltage source constructed as shown in FIG. 3 is connected to terminal 62. The voltage applied by this source to the bases of transistors 58 and 70 compensates for variations in temperature so as to maintain a constant voltage at resistor 66 and 68 at both binary voltage levels. Since a temperature tracking current flows from the emitters of transistors 64 and 65 to power bus 36, a temperature tracking current also flows through resistor 67 and the sum of the currents flowing through transistors 64 and 65 also tracks with temperature. Thus, node 61 remains at a constant voltage level irrespective of binary value of the data bit, and transistor 54 is effectively connected in a common base configuration. Because of the connection from node 61, which is at a constant voltage level, through the base-to-emitter circuit of transistor 54, which essentially maintains a constant voltage drop, to transmission line 16 and the constant current flowing from the emitter of transistor 54 through transistor 58 and resistor 59 to power bus 36, an approximately constant voltage level is impressed upon transmission line 16, irrespective of the binary value of the data bit being transferred on transmission line 16. As a result, the capacitance of pads 50 and 57 is not charged and discharged as current mode data is transferred between chips.

A typical characteristic impedance of transmission line 16 in the case of a conductive path printed circuit board interconnection between chips is about 50 to 70 ohms. This is the same order of magnitude as the input impedance of common base transistor 54, which decreases with increasing current amplitude therethrough. To take advantage of this property of common base transistors, transistor 54 is biased so its input impedance is slightly above the characteristic impedance of transmission line 16 for the small current amplitude representing one binary value and is slightly below the characteristic impedance of transmission line 16 for the high current amplitude representing the other binary value. In this manner, the average input impedance of transistor 54 approximately matches the characteristic impedance of transmission line 16 without the necessity for a power dissipating terminating resistor.

In operation transistor 54 serves to respond to the amplitude of the current flowing through transmission line 16. When the amplitude of the current is low representing one binary value, the voltage level at the collector of transistor 54 rises and transistor 64 conducts more than transistor 65, thereby impressing on terminal 22 a higher voltage level than terminal 24. When the amplitude of the current is high, the voltage level at the collector of transistor 54 drops and transistor 65 conducts more than transistor 64, thereby impressing on terminal 24 a higher voltage level than terminal 22. Transistors 64 and 65 function as a Schmitt trigger. Connection 69 provides positive feedback and thus serves to accelerate the transitions of transistors 64 and 65, thereby sharpening the pulses produced at terminals 22 and 24.

In a typical embodiment of the invention, the current and voltage swings, bias voltages and component values are as follows. The current through resistor 46 is 0.750 milliamperes (ma). The current through resistor 59 is 0.120 ma. The current through resistor 72 is 0.730 ma. The current swing of the collector current of transistor 43 is ~0 to 0.750 ma. The current swing of the collector current of transistor 54 is 0.120 to 0.870 ma. The current swing of the collector current of each of transistors 64 and 65 is ~0 to 0.730 ma. The voltage swing at terminals 10, 12, 22, and 24 is 120 millivolts (mV). The voltage swing at the collector of transistor 54 is 150 mV. The voltage swing at the emitter of transistor 54 is 35 mV. Bias voltage $V_{EE}$ is 5.2 volts. The bias voltage applied to terminals 48 and 62 is −3.9 volts. The voltage at node 61 is −100 mV. The voltage at the collector of transistor 54 when transmitting low current amplitude is −100 mV. Resistors 38, 40, 46, 55, 59, 66, 67, 68, and 72 are P-type having ohmic values to ±20% as follows: 18K, 18K, 750, 450, 4K, 300, 250, 300, 1K. Transmission line 16 is a 70 ohm line up to four inches long. Each pad and package lead has a capacitance of 2 picofarads. The transistors are FAST ——Z (fineline); transistors 42, 43, 54, 64, and 65 are type VN07211 and the remaining transistors are type VN6H111.

What is illustrated in FIGS. 1 and 2 is the circuitry for transmitting one bit of binary data from chip to chip. The described circuitry, with the exception of conductive pads and package leads 34, 37, 50, 56, 57 and 60, ground bus 32 and power bus 36, is repeated for each data bit being transferred from chip to chip.

FIG. 3 illustrates the temperature compensating voltage bias source connected to terminal 48 or terminal 62. A separate source would be connected to each of these terminals rather than a common source. The collector of an n-p-n transistor 74 is connected to ground bus 32. The emitter of transistor 74 is connected to the collector of an n-p-n transistor 76. The collector of transistor 76 is also directly collected to the base thereof. The emitter of transistor 76 is connected by a resistor 78 to power bus 36. The collector of an n-p-n transistor 80 is connected by a resistor 81 to ground bus 32. The collector of transistor 80 is also directly connected to its base and to the base of transistor 74. The emitter of transistor 80 is connected to the collector of an n-p-n transistor 82. The collector of transistor 82 is also directly connected to its base. The emitter of transistor 82 is connected by a resistor 84 to power bus 36. Since the described bias voltage source is conventional, its mode of operation will not be described. In well known fashion, this source compensates for changes in the characteristics of the transistor and resistor which it biases to maintain a constant output voltage swing therethrough with changing temperature.

FIG. 4 illustrates schematically how the invention can be incorporated into an integrated circuit chip. Like reference numerals refer to the same components described in FIGS. 1 and 2. Different subscripts are used to identify the components for different data bits, i.e., a, b, ... n. Terminals pads and package leads 57a, 57b, ... 57n are connected to input circuits, namely, voltage converter/pulse shapers 18a, 20a, 18b, 20b, ... 18n, 20n respectively. Current-to-voltage converters/pulse shapers 18a, 20a, 18b, 20b, ... 20n are connected to an input register 86. Register 86 is coupled to digital signal processing circuitry 88. Circuitry 88 could comprise arithmetic units, memory units, and/or other digital data processing circuitry normally incorporated into integrated circuits. Circuitry 88 is coupled to an output register 90. Register 90 is connected to output circuits, namely, current mode driver switches 14a, 14b, ... 14n. Current mode driver switches 14a, 14b, ... 14n are connected to conductive pads and package leads 50a, 50b, . . . 50n, respectively. Ground bus 32 is connected to each of the described input and output circuits. Power bus 36 is also connected to each of the input and output circuits.

In summary, each integrated circuit chip used into a complex electronic system is preferably provided with the input and output circuits incorporating the described principles of the invention so as to permit data transmission at a substantially higher rate than voltage mode input and output circuits without incurring a corresponding power dissipation penalty.

FIG. 5 discloses a test setup to determine if current mode driver switch 14 is switching properly. Specifically, driver switch 14 and a voltmeter 100 are connected to a node 102 of a diode bridge. A DC reference voltage source 104 is connected between ground and a node 106 of the bridge. A DC current source 108 is connected to a terminal 110 of the bridge. A current source 112 is connected to a node 114 of the bridge. The direction of current flow of source 108 vis-a-vis the bridge is opposite the direction of current flow of source 112. In other words, current flow from source 108 is into the bridge and current flow from source 112 is out of the bridge. By way of example, current sources 108 and 112 could be constructed in the same manner as the current sources in the emitter circuit of transistor 54 if desired. Diodes 115, 116, 117 and 118 are poled to conduct current from source 108 to source 112. Preferably, sources 108 and 112 generate the same current amplitude, which defines a current amplitude threshold. (By way of example, the current value of sources 108 and 112 could be 0.30ma.) When the current generated by switch 14 lies below this threshold, node 102 is at the reference voltage level. When the current generated by driver switch 14 exceeds this current threshold, the voltage level at node 102 drops by about the value of the voltage drop through one of the diodes. Thus the bridge converts the current amplitude change of driver switch 14 to a voltage change, thereby verifying that driver switch 14 is properly transitioning between binary values.

The described embodiments of the invention are only considered to be preferred and illustrative of the invention concept; the scope of the invention is not to be restricted to such embodiments. Various and numerous other arrangements may be devised by one skilled in the art without departing from the spirit and scope of this invention.

We claim:

1. A high speed digital data communication system comprising:
    a source of a digital signal representative of data to be transmitted;
    a current mode driver switch for generating a current reponse to the source signal representative of the data;
    a transmission line having an input terminal and an output terminal;
    means for connecting the switch to the input terminal of the transmission line;
    a receiving circuit responding to the current amplitudes and having an input terminal wherein said receiving circuit comprises an approximately constant voltage source and a transistor connected in a common base configuration, the emitter of the transistor being connected to the output terminal of the transmission line and the base of the transistor being connected to the constant voltage source, whereby the transistor input impedance functions as the termination to the transmission line;
    means for terminating said transmission line; and
    means for connecting the output terminal of the transmission line to the input terminal of the receiving circuit.

2. The digital data communication system of claim 1, in which the receiving circuit additionally comprises a pulse shaping circuit connected to the collector of the receiving transistor.

3. The digital data communication system of claim 1, in which the pulse shaping circuit comprises a pair of transistors with emitters connected together and load resistors connected from the respective collectors of the transistor pair to a common node, a common resistor connected at one end to the common node, and means for biasing the transistor pair so the sum of the currents through them remains approximately constant, whereby the common node serves as the constant voltage source.

4. The digital data communication system of claim 3, in which the biasing means including means for compensating for temperature changes.

5. The digital data communication system of claim 3, in which the base of one paired transistor is connected to the collector of the other paired transistor and the collector of the common base transistor is connected to the base of the other paired transistor.

6. The digital data communication system of claim 1, in which the current mode driver switch comprises a pair of transistors with emitters connected together, the collector of one transistor being connected to the transmission line and the collector of the other transistor being connected to a reference potential.

7. The digital data communication system of claim 6, in which the souce is a bipolar voltage signal connected to the respective bases of the transistor pair.

* * * * *